Patented May 8, 1945

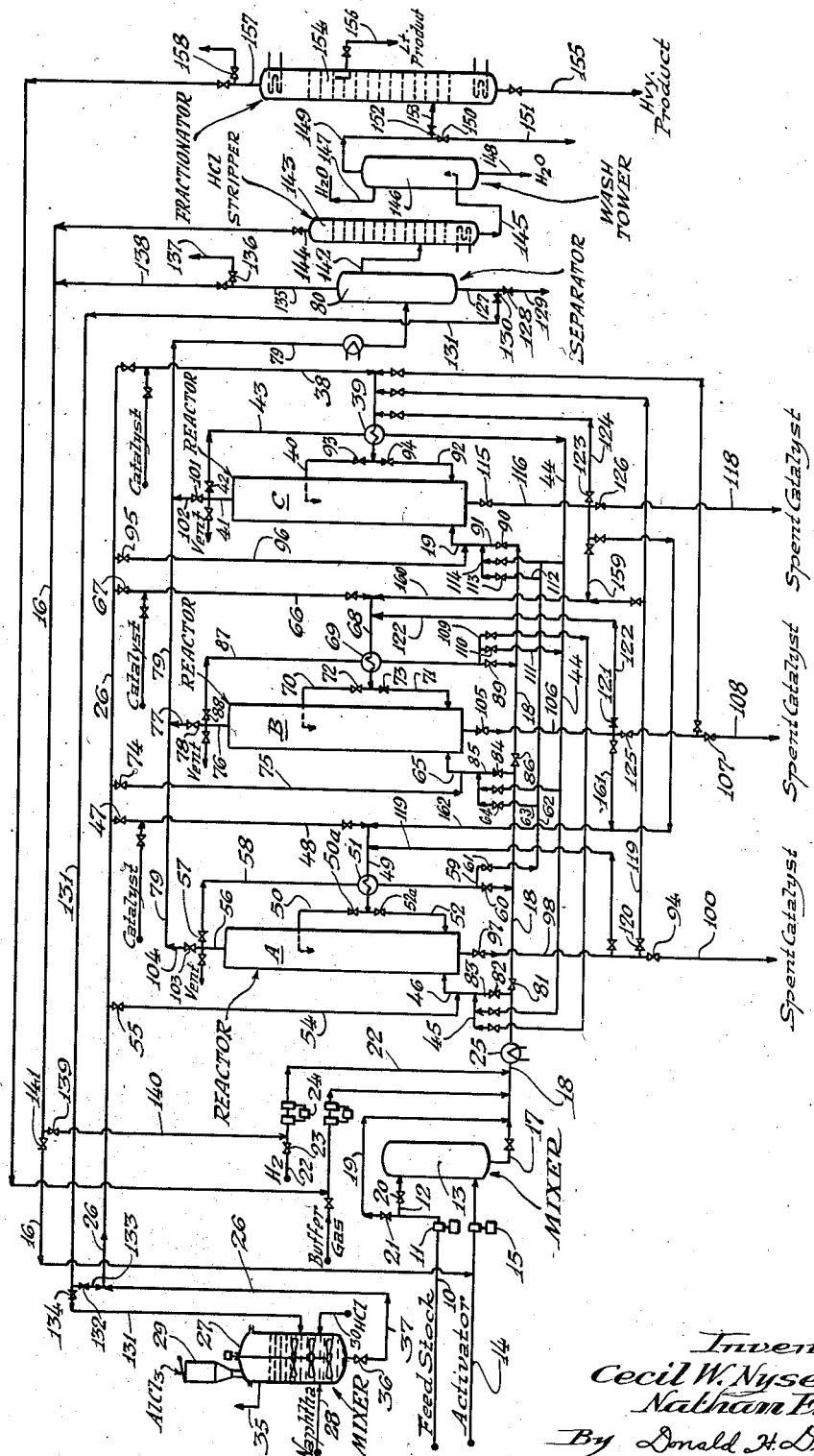

2,375,321

UNITED STATES PATENT OFFICE 2,375,321

PROCESS FOR ISOMERIZING PARAFFIN HYDROCARBONS USING AN ALUMINUM HALIDE-HYDROCARBON COMPLEX CATALYST

Cecil W. Nysewander, Highland, and Nathan Fragen, Hammond, Ind., assignors to Standard Oil Company, Chicago, Ill., a corporation of Indiana Application December 15, 1941, Serial No. 422,978

4 Claims. (Cl. 260—683.5)

This invention relates to the catalytic conversion of hydrocarbons and pertains more particularly to an improved process for the conversion of normally straight-chain hydrocarbons to branched-chain hydrocarbons involving the use of an active aluminum halide-hydrocarbon complex as a catalyst and an activator therefor.

It is well-known that branched-chain paraffinic hydrocarbons and naphthas containing them in substantial proportions are very valuable as motor fuels, and particularly as airplane fuels, because of their high antiknock values, better lead response, freedom from gum-forming tendencies, and high heat content per unit weight of fuel. It has been proposed to produce such naphthas from substantially saturated liquid fractions which are rich in straight-chain paraffin hydrocarbons by the use of aluminum chloride or other active aluminum halide catalysts in the presence of an activator such as hydrogen chloride. In carrying out the conversion of straight-chain paraffin hydrocarbons to branched-chain paraffin hydrocarbons on a refinery scale, it is extremely advantageous that the process be continuous, and this fact makes it very desirable to have the catalyst in liquid form so that it can be pumped readily through pipes, tubes and other apparatus, or be employed as a deep pool in vertical towers through which the hydrocarbons to be converted are passed. It has long been known that aluminum chloride in the presence of a hydrocarbon such as an olefinic or aromatic hydrocarbon, under conversion conditions, will gradually and sometimes very rapidly be converted into an aluminum chloride-hydrocarbon complex which is a liquid and retains a portion of the activity of the original aluminum chloride. However, such complexes are rapidly degraded under the usual reaction conditions to an inactive sludge and this degradation has been a major factor in limiting the commercial use of aluminum chloride hydrocarbon conversion processes.

We have found that hydrocarbon conversion processes, and particularly the production of branched-chain paraffin hydrocarbons from straight-chain paraffin hydrocarbons can be carried out most effectively in the presence of an active aluminum halide-hydrocarbon complex produced by the action of an aluminum halide such as anhydrous aluminum chloride on a normally liquid substantially saturated hydrocarbon fraction in the presence of an activator such as hydrogen chloride at a relatively low temperature, and that such complexes exhibit the unexpected properties of long catalyst life with comparatively easy regeneration.

The preferred complex is prepared by contacting a normally liquid hydrocarbon fraction rich in paraffinic hydrocarbons with anhydrous aluminum chloride or aluminum bromide in the presence of an activator, such as a hydrogen halide or a compound yielding a hydrogen halide under the reaction conditions at a temperature within the range from about 50 to about 225° F., preferably at a temperature in the range from about 100° F. to about 150° F. and at atmospheric pressures or slightly above. The hydrocarbon feed stock from which the catalyst is prepared is preferably free of unsaturates, although up to about 2% by weight of aromatics, or even 5% by weight can be present without too great a deleterious effect. The fraction should also be substantially free of olefinic hydrocarbons since these too react to form an undesirable complex with the aluminum halide. Cycloparaffins and naphthenes can be included in the hydrocarbon feed stock. We have found that although any hydrocarbon fraction rich in paraffinic hydrocarbons is suitable for our purpose, those containing branched-chain paraffinic hydrocarbons form a particularly desirable complex with the aluminum halide. We also prefer that the complex be formed from normally liquid hydrocarbons, preferably those having five or more carbon atoms per molecule, although a complex formed by the reaction of aluminum halide such as aluminum chloride with isobutane can be used for our purpose. Generally speaking, when hydrocarbons of low molecular weight are employed for the formation of an aluminum halide-hydrocarbon complex, it is necessary to employ higher temperatures than those hereinbefore set forth. A particularly suitable feed stock for the production of our catalyst can be a light naphtha obtained from the fractionation of straight-run gasolines from crude oils, particularly those of Mid-Continent, Pennsylvania, or Michigan origin, or from the natural gasoline obtained from natural gas wells or from "distillate" type wells. Light naphthas having a 95% distillation point of not more than about 180° F., and preferably those having a 95% distillation point of not more than 170° F., are particularly suitable. Another excellent source of hydrocarbon fractions for our purpose is the so-called "commercial isooctane" prepared by such processes as the polymerization of normally gaseous olefins to the dimers or trimers, or the corresponding co- or interpolymers, these polymers having been hydrogenated to form saturated branched-chain hydrocarbons.

The exact composition of the complex has not been ascertained but apparently the hydrocarbons do not replace the halogens in the aluminum halide metathetically, since an analysis of a complex of this nature was as follows:

|  | Weight percent |
|---|---|
| Aluminum | 12.5 |
| Chlorine | 44 |
| Carbon plus hydrogen | 43.5 |

Cl/al (atomic ratio=2.7).

From the ratio of chlorine to aluminum it will be seen that the chlorine atoms have not been replaced by hydrocarbon radicals, since otherwise the ratio of chlorine to aluminum would have been of the order of 2:1 to 1:1. An attempted analysis of the hydrocarbons separated from the complex by hydrolysis was not too revealing as to their structure but did indicate that the hydrocarbons present were not joined to the aluminum halide in paraffinic form, i. e., that the complex was not a "loose" combination of the aluminum halide and the original hydrocarbon in its original form. The particular analysis of the complex is not important for our purpose, however, except as it serves to distinguish these catalysts from aluminum halide-hydrocarbon complexes formed by the interaction of aluminum halide with, for example, olefins or aromatics. Apparently paraffins, olefins and aromatics each form a distinct type of hydrocarbon complex with aluminum halide, these complexes differing materially in their catalytic effect as well as in physical and other chemical characteristics, and we wish specifically to exclude from use in our process the catalysts formed by the interaction of an aluminum chloride with olefins or aromatics.

A particularly effective catalyst has been found to be obtained when the paraffinic hydrocarbon with which the aluminum halide is reacted to form the catalyst contains at least two side chains per molecule, i. e., when highly branched isomeric paraffinic hydrocarbons are employed as the hydrocarbon feed stock in the catalyst preparation step. A catalyst of this nature has been prepared by stirring together at atmospheric pressure a quantity of anhydrous aluminum chloride with an excess of commercial isooctane at 120° F. to 140° F. until a liquid complex resulted. Gaseous hydrogen chloride was bubbled through the reaction mixture and a reflux arrangement was employed. During the complex formation large amounts of isobutane were produced and the unconverted hydrocarbon liquid contained about 50% of material boiling higher than the end point of the original isooctane. The complex itself was separated from the unreacted hydrocarbons and from the unreacted aluminum chloride, which latter substance can be ultimately converted in its entirety to complex by further treatment with additional quantities of isooctane. The catalyst complex had a viscosity less than that of an SAE 50 lubricating oil and could be easily pumped through pipes, towers, etc., for intimate contact with the reacting hydrocarbons.

Although it is desirable to use a preformed catalyst complex, this is not absolutely necessary. If the feed stock to be isomerized is comparatively free of olefinic and/or aromatic hydrocarbons and particularly if it is a light paraffinic naphtha containing hydrocarbons having less than seven carbon atoms per molecule, the complex can be formed in situ under the reaction conditions by the introduction of the aluminum halides either in the form of a slurry or a solution. A portion of the feed stock is usually employed for making up the slurry or solution, although a part of the isomerization product can also be used for this purpose.

It is an object of our invention to provide an improved process employing a catalyst of the above description for the conversion of a hydrocarbon fraction rich in straight-chain paraffinic hydrocarbons to a fraction rich in highly branched-chain paraffinic hydrocarbons with an optimum yield of product of maximum octane number. Another object of our invention is to provide an improved process whereby a hydrocarbon fraction rich in straight-chain paraffinic hydrocarbons is contacted with an aluminum chloride-hydrocarbon complex of the above description under conditions of temperature and pressure whereby a hydrocarbon fraction of high octane number is produced rapidly and efficiently. A further object of our invention is to provide a process whereby a hydrocarbon fraction rich in straight-chain paraffinic hydrocarbons is contacted with an aluminum halide-hydrocarbon complex in two or more zones of varying reaction conditions, whereby a fraction rich in branched-chain paraffinic hydrocarbons of high octane number is produced rapidly with maximum yield. A further object is to provide an improved process wherein a light paraffinic naphtha is subjected to the action of an aluminum halide-type catalyst in a plurality of reaction zones maintained under different conditions for the production of the maximum octane number in the most efficient manner. A still further object of our invention is to correlate operating conditions such as temperature, pressure, catalyst activity, etc. throughout a multistage isomerization system, in such a manner as to produce maximum yields of the most desirable products with a minimum consumption of catalyst, activator and hydrogen, and with an extremely efficient arrangement of reaction zones. Additional objects and advantages of our invention will become apparent as the description thereof proceeds, particularly when read in conjunction with the accompanying drawing which represents a schematic flow diagram of apparatus suitable for carrying out one embodiment of our invention.

The feed stock for our isomerization process can be any substantially saturated naphtha rich in straight-chain paraffinic hydrocarbons; for example it can be a relatively pure normally liquid straight-chain or slightly branched-chain paraffin hydrocarbon, such as normal pentane, normal hexane, 2 methylpentane, etc., but generally, predominantly straight-run naphthas such as those from Michigan, Pennsylvania and Mid-Continuent crude oils are preferable, since they are much more readily available. Another excellent feed stock is a highly paraffinic naphtha produced by the Fischer-Tropsch process from carbon monoxide and hydrogen. Natural gasoline fractions and so-called distillates are also suitable and are plentiful and inexpensive in some production areas. It is very important that the feed stock be free or substantially free from aromatic hydrocarbons since they have been found to reduce the activity of the catalyst to a very marked degree and consequently to limit seriously the amount of conversion obtained per unit weight of catalyst. Our preferred feed stock therefore contains less than about 5% and preferably 0.5 to 2.0% or less of aromatic hydrocarbons. In many cases a preliminary solvent extraction step or other treatment is necessary or desirable in order to reduce the aromatic content of the feed. Olefinic hydrocarbons are also undesirable and should not be present in more than very small amounts, while cycloparaffins or naphthenic hydrocarbons can be tolerated in considerable quantities. It is also frequently desirable to limit or eliminate paraffinic hydrocarbons higher boiling than the hexanes. Nevertheless, the feed stocks should preferably contain at least 50% of paraffin hydrocarbons and those containing at least 80% of paraffin hydrocarbons are especially desirable.

In general, the naphtha feed stock should have a boiling range within the range from about 100° F. to about 500° F., although naphtha having an initial boiling point as low as about 30° F. including about 25 to 30% by weight of butanes can be used. A particularly suitable feed is one prepared by the distillation and fractionation of a straight-run or natural gasoline stock to produce a light naphtha having an initial boiling point in the range from about 30° F. to about 90° F., or higher, and a 95% boiling point in the range from about 145° F. to about 158° F., preferably about 152° F., although fractions having a 95% point of about 180° F. or less, preferably not above 170° F., can be tolerated providing they are substantially free of aromatics.

Briefly stated, our process provides for the treatment of a feed stock of the above described characteristics in two or more reactors in series, these reactors being maintained at various temperatures depending upon the condition of the catalyst therein. We have found that the maximum optimum improvement can be obtained at a temperature within the range, for example, of 200 to 300° F. The rate of octane improvement, however, or the reaction rate is substantially faster at higher temperatures, as for example, from 300 to 400° F. Furthermore, the fresh catalyst requires a period of time—an induction period—in which to reach its peak activity, and this induction period may be shortened by an initial period of operation at the higher temperature named above. Thus the general plan of operation will be as follows: The naphtha passes first through reactor A which contains the partially spent catalyst heated to the more elevated temperatures, then into reactor B which contains the fresh catalyst at peak activity. Reactor C containing fresh catalyst is heated to the high temperature and put into the stream ahead of reactor A until the induction period is over and the catalyst has reached its peak activity. The temperature is then quickly dropped to the optimum temperature and reactor C is relocated in the naphtha stream placing it now following reactor B. As the catalyst in reactor A becomes increasingly less active the temperature is increased until the catalyst has become substantially completely spent. During these last stages of deactivation in reactor A the temperature of the catalyst in reactor B is increased so that when reactor A is removed from the system reactor B is in the higher range of temperature. Thus at this stage the reactor A is removed from the system for cleaning and refilling with fresh catalyst, reactor B is at the elevated temperature and accomplishing a large part of the octane improvement, while reactor C at the lower temperature is completing the reaction to give the highest possible octane improvement. When reactor A has been refilled it is brought back onstream in the same manner as reactor C just described. If the time required by the cleaning and refilling operation plus the induction period requires too great a time, a fourth reactor or more can be used.

The reaction is carried out in each reactor in the presence of an activator, such as hydrogen chloride or a substance affording hydrogen chloride under the reaction conditions. Preferably the hydrogen halide is absorbed in the charging stock, and since only a minor amount of the hydrogen chloride in the system is consumed, a large part of the activator will be obtained from recycle gases. The amount of hydrogen chloride present in each reactor is desirably in the range from about 5 to about 30 pounds per barrel of charging stock to the reactor, usually within the approximate range of 8 or 10 pounds per barrel, but most of this is recovered and reintroduced into the system.

The reaction is also preferably carried out in the presence of hydrogen, and under superatmospheric pressures within the approximate range of 100 to 3000 pounds per square inch, preferably about 500 to about 1500 pounds per square inch, a large part of the pressure being due to the partial pressure of the hydrogen present. The amount of hydrogen required will vary somewhat with the temperature, pressure and hydrogen chloride concentration in the reaction zone, ranging from about 20 cubic feet per barrel of stock charged at low temperatures, low pressures and low hydrogen chloride concentrations to 200 or more cubic feet per barrel at high temperatures, pressures and hydrogen chloride concentrations. Usually the actual hydrogen consumption will be about 100 cubic feet per barrel, but in order to insure the presence of the requisite amount of hydrogen in the reactor we prefer to introduce about 100 to 300, preferably about 200 cubic feet of hydrogen per barrel of charging stock.

The make-up aluminum chloride which is preferably in the form of a complex but nevertheless may be added as a slurry or solution, may be within the range from about 0.4 to 4.0 pounds per barrel of charging stock, usually within the approximate range of 1 or 2 pounds per barrel.

The incoming charging stock is mainly in the liquid phase but it may be partially vaporized by the gaseous hydrogen present and thereby sufficient turbulence and contact is obtained to effect adequate mixing of the charging stock and catalyst. Based on the stock charged and the amount of complex present in the reactor, the space velocity should be within the approximate range of 0.2 to 4.0 volumes of liquid feed per hour per volume of complex in the reactor, preferably about one-half volume of stock per hour per volume of catalyst.

Referring now to the drawing, feed stock, which for purposes of this description may be a light paraffinic naphtha containing substantial quantities of $C_5$ and $C_6$ hydrocarbons, is added through line 10, pump 11 and line 12 to absorber 13 while activator is added through line 14 and pump 15 and flows countercurrent to the charging stock stream. As activator we can employ a hydrogen halide, such as hydrogen chloride or hydrogen bromide, or we can use a substance affording a hydrogen halide under the reaction conditions. Included in such substances are the alkyl halides such as propyl halide, butyl halide, ethyl halide, particularly the chlorides, as well as chloroform and similar organic halides. We can also employ chlorine which, with the hydrocarbons present in the feed stock, will form hydrogen chloride under the reaction conditions, and we can also use water which will react with the catalyst present to yield hydrogen halide, although this latter expedient is not too desirable, since it deteriorates the catalyst to a very considerable extent. We can also generate the hydrogen chloride outside the unit by any one of a number of processes. Whenever the expression "substance affording a hydrogen halide under the reaction conditions" or similar remark is used in the specification and claims, it is intended that these shall include the hydrogen halides themselves, as well as the substances which will yield a hydrogen halide in the reaction zone.

The solubility of hydrogen chloride in a light naphtha at various temperatures and pressures is shown in the following table:

Table

| HCl pressure | Weight per cent HCl in light naphtha | | |
|---|---|---|---|
| | 58° F. | 215° F. | 336° F. |
| 8 lbs./in.² | 0.4 | | |
| 25 lbs./in.² | | | 0.35 |
| 35 lbs./in.² | | 0.8 | |
| 85 lbs./in.² | 8.3 | 2.0 | |
| 135 lbs./in.² | | | 2.3 |
| 150 lbs./in.² | 14.4 | | |
| 185 lbs./in.² | | 5.3 | |
| 195 lbs./in.² | 22.6 | | |
| 205 lbs./in.² | | | 3.9 |

Absorber 13 is preferably maintained at a temperature within the range from about 80° F. to about 150° F. and at a pressure within the range from about 100 pounds per square inch to about 300 pounds per square inch, for example about 250 pounds per square inch. A very considerable part of the hydrogen halide is obtained by absorbing the hydrogen chloride from the gases from the system introduced through line 16. The naphtha having dissolved therein the hydrogen chloride or other activator is withdrawn through line 17 to line 18. Instead of using all of the charging stock for absorbing the hydrogen chloride, a major part can be directed through line 12 to absorber 13, and the remainder directed to line 18 via line 19, valves 20 and 21 in lines 12 and 19 respectively being adjusted for that purpose.

We prefer that the isomerization reaction be carried out under a considerable hydrogen pressure and for this reason hydrogen is added from line 22 through valve 23 and compressor 24 to line 18. The reaction is preferably carried out at hydrogen pressures within the range from about 100 pounds per square inch to 3000 pounds per square inch, preferably between 500 pounds per square inch and 1500 pounds per square inch. Relatively pure hydrogen is, of course, particularly suitable but in the plant operation of our process hydrogen containing impurities such as methane is often available at much lower cost and can be used effectively as long as the hydrogen content of the gas is above 50 mol percent, in which case the hydrogen pressure previously mentioned would be the hydrogen partial pressure rather than the total gas pressure.

The reactants are preheated to temperatures between 200° F. and 400° F. in heater 25 and are directed via line 18 and lines 91 and 19 to reactor C which is charged with newly regenerated or fresh catalyst from line 26. The catalyst can be prepared in reactor 27 by contacting therein a paraffinic naphtha from line 28 and anhydrous aluminum chloride from hopper 29 or other source. Hydrogen chloride or other activator can be added from a source (not shown) via line 30 to the complex generator. The reactants are preferably maintained at a temperature within the range of about 50° F. to about 225° F., preferably about 100° F. to about 150° F. and the generator is so arranged that reflux will be provided in the upper part of the reactor. Substantially atmospheric pressure is usually employed for the production of catalyst complex external to the system. The unconverted hydrocarbon and light gases formed can be withdrawn from catalyst generator 27 through line 35. A particularly suitable complex and one which we prefer is made by the reaction of commercial isooctane containing a large amount of 2,2,4-trimethylpentane with aluminum chloride using hydrogen chloride as an activator. The fresh complex is withdrawn from generator 27 through valve 36 and line 37 joining line 26.

The fresh or regenerated catalyst is preferably added to reactor C via line 38 and heater 39 (which may be a heat exchanger) and valved line 40. As was previously pointed out, the fresh catalyst apparently requires an induction period or period of contact with a feed stream before optimum activity is obtained and this induction period can be materially shortened if carried out at elevated temperatures. Accordingly, the feed stream from line 18 and line 19 is contacted with the catalyst in reactor C at a temperature of about 300° F. to about 400° F., preferably about 350° F. for a period of about two hours. The fresh feed bubbling through the tower passes overhead through line 41 and is directed via valve 42 and lines 43, 44 and 45 to line 46 leading to reactor A. Reactor A contains catalyst which is no longer suitable for catalyzing the isomerization reaction under optimum conditions, i. e., at temperatures within the range of from 200 to 250° F. wherein a high equilibrium octane number can be obtained. Reactor A is also maintained at a temperature within the range of about 300 to 400° F., preferably about 330° F., and under the previously described conditions of pressure, activator concentration, etc.

The products from the top of reactor A are withdrawn through line 56 and directed to reactor B through lines 58, 59, 62, 64 and 65, valve 60 in line 58 being closed and valves 57, 61 and 63 in lines 58, 59 and 64 respectively being open. Reactor B is maintained within an optimum temperature range of from about 200° F. to about 250° F., preferably about 212° F. and under the previously described conditions of pressure, activator concentration, etc., and therein a high octane number is obtained, or in other words the final conversion of the paraffinic hydrocarbons in the feed stock to the most highly branched-chain configuration takes place. The products are withdrawn from reactor B via line 76 and line 77 through valve 78 to line 79 leading to separator 80.

Preferably not all of the stock to be converted has been passed through reactor C since it is only necessary that reactor C be "on stream" a sufficient length of time to bring the catalyst therein to peak activity. When this period of peak activity has been reached, the feed stock to reactor C is shut off by closing valve 81 in line 18 and valve 42 in line 43, and directing the feed stock directly to reactor A by opening valve 82 in line 83 which joins line 46. Reactor C is meanwhile lowered in temperature and as soon as the catalyst in reactor B is no longer effective for obtaining the maximum amount of conversion of feed stock to a high octane number at that temperature, the temperature in reactor B is gradually raised until it is at the temperature previously used in reactor A. The feed stock to reactor A is then cut off by closing valve 82 in line 83 and the fresh feed directed to reactor B by opening valve 8 in line 18 and valve 84 in line 85 which joins line 65, valve 86 in line 18 being closed. Reactor C is now put on stream as the optimum reactor, the reaction therein being carried out at temperatures within the range from 200 to 250° F., the feed stock passing from line 87 through valve 88 from line 76 to line 18 by opening valve 89 therein and thence through valve 90 and line 91 to line 19.

Meanwhile, the catalyst has been withdrawn from reactor A by opening valve 97 in line 98 and can be discarded by opening valve 99 in line 100 or used for the production of hydrogen chloride by treatment with water, steam, or sulfuric acid. If water is employed it should be used in less than stoichiometric amounts in order that the recovered hydrogen chloride will be substantially anhydrous; the sludge will thereupon be converted into a cokey mass that can be removed from the drum by hydraulic or other conventional decoking means. A larger amount of anhydrous hydrogen chloride can be recovered by the use of sulfuric acid and the resulting sulfuric acid sludge can be charged to a conventional sludge coker for the recovery of sulfuric acid.

When reactor A has been cleaned of spent sludge, valve 97 is closed and fresh complex can be added to reactor A from line 26 via valve 47 and lines 48, 49 and 50 passing through heater 51, if desired, so that it is heated to the proper temperature. Catalyst can also be introduced concurrently with the incoming feed stock by introducing it through line 52 in which case, valve 50a in line 50 will be closed and valve 52a in line 52 will be open. Another alternative is to add the catalyst directly to the incoming charging stock via line 54 and valve 55 leading from line 26 to line 46. It is now necessary that the catalyst therein be subjected to the initial induction period. Accordingly, the fresh feed stock in line 18 flows through valve 82, line 83 and line 46 to reactor A, thence through valve 57 and line 58 and valve 60 to line 18, and then through valve 84, and lines 85 and 65 to reactor B which is being maintained at the higher temperatures; then through line 76, valve 88, line 87 and valve 89 to line 18, valve 90, line 91 and line 19 to reactor C (valves 81 and 86 being closed). The products are taken overhead from line 41 through valve 101 and line 102 which joins line 79 leading to separator 80.

After the catalyst in reactor B becomes completely spent, valve 84 in line 85 is closed thereby shutting off the flow of charging stock to reactor B. The charging stock thereupon flows first to reactor C as previously described and thence to reactor A, the ultimate product being taken overhead from the reactor A by opening valve 103 in line 104 which joins line 79 leading to separator 80, reactor C being at the higher temperature and reactor A at the optimum temperature.

The spent catalyst from reactor B is withdrawn by opening valve 105 in line 106 and can also be discarded or sent for hydrogen chloride recovery by opening valve 107 in line 108. Fresh catalyst can be added from line 26 via line 66 and valve 67 passing through line 68, heater 69 and valved line 70. Again, if it is desirable to pass the stock concurrently with the catalyst, the catalyst can be added through line 71, valve 72 in line 70 being closed and valve 73 in line 71 being open. Alternatively, the catalyst can also be added directly to the product stream entering through line 65 by opening valve 74 in line 75 which leads directly from line 26 to line 65. Reactor B is now put in the line first, prior to the high temperature reactor. To accomplish this, feed stock is directed via line 18, line 85, valve 84 and line 65 to reactor B, the hydrocarbon and activators then passing through line 76, valve 88, line 87, line 109, valve 110 line 111, and line 44 to line 45 and line 46, thence through reactor A, line 56, valve 57, line 58, line 59, valve 61, line 62, line 112, valve 113, and line 114 to line 19 leading to reactor C.

It will thus be seen that the system is so arranged that any reactor can be cut out of the system for the installation of fresh catalyst, placed back on stream for an induction period at any point in the system, and that the products can flow from the reactor at the high temperature to the reactor of optimum temperature and thence to separator 80. By the proper manipulation of the valves the various products are directed via the various lines to and from each of the reactors. Catalyst can also be withdrawn from reactor C by opening valve 115 in line 116 and discarded or used for hydrogen chloride production by opening valve 117 in line 118. Fresh catalyst can be added to reactor C either through line 40 or, if to be used concurrently, through line 92, valve 93 in line 40 being closed and valve 94 in line 92 being open. Alternatively, it can also be added directly to the charging stream by opening valve 95 in line 96 which joins line 19.

It is also perfectly possible to recycle the catalyst on each of the reactors or to recycle a portion of the catalyst and withdraw the remainder for regeneration or discard. In order to obtain recycle on reactor A, line 119 having valve 120 therein leads from line 98 to line 49; in reactor B recycle is obtained by opening valve 121 in line 122 which leads from line 106 to line 68; and in reactor C recycle is obtained by opening valve 123 in line 124 which leads from line 116 to line 39. By the proper adjustment of valves 99, 125 and 126 in lines 98, 106 and 116 and valves 120, 121 and 123 in lines 119, 122 and 124, the proper proportion of recycle and withdrawn catalyst can be obtained.

The isomerization products in line 79 are passed to separator 80 which can be a warm settler drum or preferably a cool settler at reduced pressures, wherein dissolved as well as mechanically entrained catalyst is removed and hydrogen chloride and other gases discharged for recycle. Actually, although separator 80 has been shown as a single vessel, it may be a series of vessels, preferably arranged at decreasing temperatures and pressures, with means for the recovery of catalyst from the base of each and the discharge of gaseous hydrocarbons from the top of one or more of them. Preferably, if the cool settler is used, a temperature of 100° F. or less and a pressure within the approximate range of 100 to 300, for example about 250 pounds per square inch, is employed. The catalytic material withdrawn from the base of separator 80 through line 127 can, of course, be discarded by opening valve 128 in line 129 but preferably is returned for the formation of additional amounts of complex by opening valve 130 in line 131 leading to catalyst generator 27. If for example a warm settler and a cold settler are each employed it is quite possible that a considerable amount of complex will be obtained in the warm settler and this can be recycled directly to the reaction zones by opening valve 132 in line 133 which joins line 26, valve 134 in line 131 thereon being closed.

The released gases leave the top of separator 80 through line 135 and can be vented by opening valve 136 in line 137. Preferably, however, they are recycled via line 138 and line 16 to line 14 leading to absorber 13 so that the hydrogen chloride present with or without the hydrogen can be reused in the reaction. Alternatively, of course, it is possible to recycle the hydrogen plus hydrogen chloride to the hydrogen inlet line 22 by opening valve 139 in line 140 which joins line 22, valve 141 in line 16 being closed, but generally this is not too desirable, since the amount of hydrogen added can be regulated to a slight excess above that normally required to maintain the activity and catalyst life of the complex to the greatest possible extent while the hydrogen chloride is seldom consumed to anywhere near the same extent, and therefore it is much more advantageous to have the hydrogen chloride reabsorbed with the elimination of unwanted light gases which may build up in the system than to attempt to recover the hydrogen chloride and hydrogen together.

The products in separator 80 are withdrawn through line 142 and are desirably sent to a hydrogen chloride stripping tower 143 provided with heating means at its base, and may have a reflux arrangement (not shown) for the recovery of butane and heavier hydrocarbons. This stripping column can be operated at a pressure of about 200 pounds per square inch with a top temperature within the approximate range of 100 to 150° F. and a bottom temperature within the approximate range of 300 to 400° F. The removed hydrogen chloride together with released gases such as hydrogen, methane, ethane, etc., is taken overhead through line 144 to line 16 which will return the gases preferably to the absorber system for the recovery of hydrogen chloride, or if necessary, they can be discarded through line 144a.

The liquid products are withdrawn from the base of hydrogen chloride stripper 143 by line 145 and directed to a wash tower 146 wherein any final traces of acid gas or catalyst are removed. The wash tower may be provided with suitable baffles, trays or bubble plates for effecting intimate contact of the upflowing products with the caustic solution introduced through line 147 and withdrawn through line 148. The washed products pass overhead through line 149 and can be withdrawn as such by opening valve 150 in line 151 but preferably are subjected to fractionation to separate a desired "isomate" from heavier and/or lighter hydrocarbons which may be present; if the products are to be fractionated, valve 150 is closed and valve 152 in line 153 leading to fractionator 154 is opened. The isomate, for example, can be fractionated to insure the removal of any heptanes or heavier hydrocarbons and to obtain a product of desired Reid vapor pressure for blending in any desired amount with isooctane for making super aviation fuel. The heavier product will be withdrawn via valved line 155 while the desired light product is obtained from line 156. Lighter gases which might still be present pass overhead through line 157 and can be vented through valved line 158. Alternately, all of the isomate can be withdrawn either through line 155 or line 156, and the light gases taken overhead.

Although we have thus far discussed a process in which catalyst is maintained within a reactor until substantially exhausted for promoting the isomerization of the feed stock further, the same effect can be obtained in another manner; for example, it is possible to use reactor C always as the "induction period" reactor, reactor A as the "high temperature" reactor, and reactor B as the "optimum condition" reactor, and to direct the catalyst from one reactor to the other in that sequence either continuously or batchwise. In this event fresh feed stock will always be directed to reactor C for the induction period via lines 18, 91 and 19 and the hydrocarbon plus activator and hydrogen taken overhead through line 41 and directed to reactor A via lines 43, 44, 45 and 46. The products from reactor A pass overhead through lines 56, 58, 59, 62, 64 and 65 to reactor B and the products are withdrawn therefrom via lines 76, 77 and 79 to separator 80. Meanwhile, fresh catalyst is added to reactor C from line 26 either via lines 38, 39 and 92 or via line 96, the "conditioned" catalyst from reactor C being directed via lines 116, 159 and 160 to lines 68 and 71 or 70 to reactor B which is maintained at the optimum temperature. The catalyst which is no longer effective at the lower temperatures for obtaining optimum conversion in reactor B is withdrawn via line 106 and directed to reactor A via lines 161, 162, 49 and 51 to reactor A wherein it is maintained at the higher temperature for the conversion of paraffinic hydrocarbons to isoparaffinic hydrocarbons in the feed stock. Other sequences can, of course, be arranged, lines having been indicated for that purpose so that any of the reactors can be employed at any of the temperatures and with any of the feed stocks previously described. Recycle lines are also provided for reactors A and B as well as C, although, generally speaking, since reactor C is only the "preliminary" reactor and the catalyst is being conditioned therein, it will not generally be desirable to carry on any recycle at this stage. However, such recycling is frequently advantageous for better mixing and contact of the catalyst and feed stock.

Another advantage accrues to the process wherein each of the reactors is maintained at a definite temperature for a definite purpose as compared with the process wherein the temperature of the reactor is changed as conditions warrant. For example, it has been found that when operating at the higher temperature, much less reactor volume is required. Every given feed stock has an "equilibrium octane number" which is the highest constant octane number obtainable on that feed stock at a specific temperature, and is not affected by increased time of contact or increased ratio of catalyst-to-oil or any other similar variable. For example, the "equilibrium octane number" of a light naphtha feed stock having a 95% point of about 150° F. will be 85 at 212° F. and 82 at 330° F.; the feed having had an initial octane number of 70. Accordingly, from this it will be seen that no amount of treatment in reactor A at 330° F. will produce a product having an octane number greater than 82.

On the other hand, operating at 212° F., where it is possible to obtain the higher octane number, requires a much greater time of contact. Accordingly, if reactor A is maintained at a temperature of about 330° F. and reactor B at a temperature of about 212° F. the volume of reactor A can be substantially smaller than that of reactor B. Thus by carrying out the reaction in two stages at the temperatures described, with a proper relationship between the size of the stages, it is possible to decrease the total reaction space from that which would be necessary for a single stage reactor operating at a temperature sufficiently low so that the desired high octane number of 85 might be attained. Reactor C can also be of a smaller volume than reactor B; since reactor C is used primarily for conditioning the catalyst for operation in reactor B and since the induction period of the catalyst is substantially less than that of the life of the catalyst in reactor B, it will be necessary to maintain reactor C only so large as is necessary to afford a continuous supply of optimum condition catalyst to reactor B. The feed stock to reactor C can be cut in and out as necessary, or the feed stock to reactor C will be a minor portion of the total feed stock to reactor B using only so much of the fresh feed stock as is necessary to condition the fresh catalyst.

Although we have shown two reactors plus a conditioning reactor, it should be noted that our invention is not so limited and that more stages can be employed. The additional reaction zones may also be of different sizes, since the addition of further reactors operating at an intermediate temperature would also conserve reactor volume.

The reactors may advantageously take the form of towers with a deep pool of catalyst therein, although, as we have stated before, a coil or tubular reactor can be substituted therefor. Stirring devices may be employed to insure the intimate contact between reactants and the catalyst. In addition, baffles may be supplied to any or all of the tower reactors to insure a longer time of contact within the tower, or the tower can be divided into annular spaces by concentric baffles which cause the naphtha to flow over and under the baffles and thus travel in a tortuous path through the liquid catalyst thus increasing the time of reaction within the tower. It is also quite within the contemplation of this invention to use a tower equipped with bubble plates, each bubble plate being covered with a pool of catalyst so that the reactants passing up through the bubble caps will encounter the pools of catalyst over the bubble plate and thus increase the time of contact between the hydrocarbons and the catalyst. Additional variations of the design of the tower can be employed without departing from the spirit of this invention.

Instead of withdrawing the spent catalyst, as previously described, either for discard or the recovery of hydrogen chloride therefrom, it is quite within the contemplation of our invention to regenerate the catalyst as by treatment with hydrogen in the substantial absence of added naphthas. Also, it has been found that very often a catalyst which has become too viscous for use in the reactor, due either to the removal of hydrocarbons joined to the aluminum chloride in the original complex or by the addition of additional hydrocarbons to the complex, still retains a desirable amount of catalytic activity which cannot be utilized because of failure properly to contact the feed stock. If the fluidity is restored, as by contact with isooctane or similar hydrocarbons in the substantial absence of hydrogen and at a lower temperature than that at which the original reaction was carried out, the usefulness of the catalyst is again increased, and greater yield of product per unit of catalyst results. Other means of catalyst regeneration can also be employed.

Although we have described one preferred embodiment of our invention, it should be pointed out that this is by way of illustration rather than by way of limitation and that we intend to be limited only to the extent set forth in the appended claims. Various apparatus, details such as pumps, heat exchangers, automatic control devices, etc., have been omitted for the sake of clarity and will be readily supplied by one wishing to practice our invention.

We claim:

1. A process of isomerizing a paraffinic hydrocarbon feed of the naphtha boiling range which process comprises contacting a portion of the hydrocarbon feed with a fresh liquid aluminum chloride-hydrocarbon complex isomerization catalyst in a preliminary step at a temperature within the approximate range of 300° F. and 400° F. and in the presence of an effective amount of an hydrogen chloride promoter for a period of time approximating the induction period of the catalyst to form a catalyst of high activity, then contacting the hydrocarbon feed with a partially spent catalyst complex in a first reaction step at a high temperature within the approximate range of 300° F. and 400° F. and finally contacting the hydrocarbon products from said first reaction step with the catalyst of high activity in a second reaction step at a temperature lower than the temperature of said first reaction step and within the approximate range of 200° F. and 300° C., the catalyst from said second reaction step being used in said first reaction step after the activity thereof at the lower temperatures has decreased.

2. A process of isomerizing a paraffinic hydrocarbon feed of the naphtha boiling range which process comprises contacting a portion of the hydrocarbon feed with a fresh liquid aluminum chloride-hydrocarbon complex isomerization catalyst in a preliminary step at a temperature of about 300° F. and in the presence of an effective amount of an hydrogen chloride promoter for approximately two hours so as to form a catalyst of high activity, then contacting the hydrocarbon feed with a partially spent catalyst complex in a first reaction step at a temperature of about 330° F. and finally contacting the hydrocarbon products from said first reaction step with the catalyst of high activity in a second reaction step at a temperature of about 212° F., the catalyst from said second reaction step being used in said first reaction step after the activity thereof at the lower temperature has decreased.

3. A process as claimed in claim 1 wherein the paraffinic hydrocarbon feed of the naphtha boiling range consists predominantly of $C_4$ to $C_6$ paraffinic hydrocarbons.

4. A process of isomerizing a paraffinic hydrocarbon feed of the naphtha boiling range, which process comprises contacting a portion of the hydrocarbon feed with a fresh liquid aluminum chloride-hydrocarbon complex isomerization catalyst in a preliminary step at a temperature of about 300° F. and in the presence of an effective amount of an hydrogen chloride promoter for a period of time approximating the induction period of the catalyst to form a catalyst of high activity, then contacting the hydrocarbon feed with a partially spent catalyst complex in a first reaction step at a temperature below 400° F. but not lower than the temperature of said preliminary step, and finally contacting the hydrocarbon products from said first reaction step with the catalyst of high activity in a second reaction step at an isomerization temperature lower than the temperature of said preliminary step, the catalyst from said second reaction step being used in said first reaction step after the activity thereof at the lower temperature has decreased.

CECIL W. NYSEWANDER.
NATHAN FRAGEN.